US007700919B2

(12) United States Patent
Dupont et al.

(10) Patent No.: US 7,700,919 B2
(45) Date of Patent: Apr. 20, 2010

(54) DEVICE FOR DETECTING ELECTROMAGNETIC RADIATION, ESPECIALLY INFRARED RADIATION

(75) Inventors: Benoît Dupont, Grenoble (FR); Michel Vilain, Saint-Georges de Commiers (FR)

(73) Assignee: ULIS, Veurey Voroize (FR)

( * ) Notice: Subject to any disclaimer, the term of this patent is extended or adjusted under 35 U.S.C. 154(b) by 7 days.

(21) Appl. No.: 12/128,070

(22) Filed: May 28, 2008

(65) Prior Publication Data

US 2009/0008556 A1  Jan. 8, 2009

(30) Foreign Application Priority Data

Jul. 2, 2007  (FR)  .................................. 07 56217

(51) Int. Cl.
G01J 5/24  (2006.01)
(52) U.S. Cl. .................................. 250/338.1
(58) Field of Classification Search ............... 250/338.1
See application file for complete search history.

(56) References Cited

U.S. PATENT DOCUMENTS 5,952,659 A    9/1999  Yoneyama et al.
2004/0200961 A1*  10/2004  Parrish et al. ............ 250/338.1
2005/0206464 A1*  9/2005  McCorquodale et al. 331/107 A

FOREIGN PATENT DOCUMENTS

WO    WO 2007015235 A1 *  2/2007

OTHER PUBLICATIONS

Trouilleau, C. et al., "*35 μm Pitch at Ulis, a Breakthrough*," Proceedings of SPIE, SPIE, Bellingham, WA, US, vol. 5873, No. pt II, 2005, pp. 578-585.
Mottin, E. et al., "*Uncooled Amorphous Silicon Technology Enhancement for 25 μm Pixel Pitch Achievement*," Proceedings of SPIE, vol. 4820, SPIE, 2003, pp. 200-207.
Fieque, Bruno et al., "*320×240 Uncooled Microbolometer 2D array for Radiometric and Process Control Applications*," SPIE, Optical Systems Design Conference, Saint-Etienne, France, Sep. 29-Oct. 3, 2003, SPIE 5251 (7 pages).
Trouilleau, C. et al., "*Low Cost Amorphous Silicon Based 160×120 Uncooled Microbolometer 2D Array for High Volume Applications*," Proceedings of SPIE, SPIE, Bellingham, WA, US, vol. 5251, 2004, pp. 129-135.

* cited by examiner

Primary Examiner—David P Porta
Assistant Examiner—Shun Lee
(74) Attorney, Agent, or Firm—Burr & Brown

(57) ABSTRACT

A device for detecting electromagnetic radiation, especially infrared radiation, including an array of elementary bolometers which are sensitive to the incident radiation and are referred to as "active" bolometers and an additional row of bolometers which are substantially insensitive to the radiation and are referred to as "blind" bolometers. The active and blind bolometers are formed on a substrate in which a read circuit is produced for sequential addressing of each of the rows of the array and the row of blind bolometers, each of the bolometers in the same row being biased simultaneously. The read circuit includes a source for producing a reference current ($I_{ref}$) on the basis of an additional blind bolometer which is also formed on the substrate and means of copying the reference current ($I_{ref}$) to each of the columns of the array consisting of a current mirror.

11 Claims, 4 Drawing Sheets

DEVICE FOR DETECTING ELECTROMAGNETIC RADIATION, ESPECIALLY INFRARED RADIATION

FIELD OF THE INVENTION

The present invention relates to a device for detecting electromagnetic radiation, especially infrared radiation, which uses bolometric detectors. The application area of the invention is infrared imaging in particular.

BACKGROUND OF THE INVENTION

In the field of infrared detectors, the use of devices designed in the form of an array which are capable of operating at ambient temperature, i.e. which do not require cooling down to very low temperatures, is known—these are contrasted with detection devices referred to as "quantum detectors" which can only operate at very low temperature, typically at the temperature of liquid nitrogen.

These uncooled detectors traditionally use the variation in a physical unit of an appropriate material as a function of temperature at around 300 K. In the case of bolometric detectors, this physical unit is electrical resistivity.

Such an uncooled detector is generally associated with:
means of absorbing the infrared radiation and converting it into heat;
means of thermally insulating the detector so that its temperature can rise due to the effect of the infrared radiation to be detected;
thermometric means which, in the context of a bolometric detector, use a resistance element;
and means of reading electrical signals provided by the thermometric means.

Detectors intended for infrared imaging are conventionally produced as a one- or two-dimensional array of elementary detectors, said array being "monolithically" formed or mounted on a substrate generally made of silicon which incorporates means of sequentially addressing the elementary detectors and means of electrically exciting (stimulating) and of pre-processing the electrical signals generated by these elementary detectors. These means of sequential addressing, electrical excitation and pre-processing are formed on the substrate and constitute a read circuit. The term "read" denotes the formation of an electrical signal on the basis of the state of the sensing elements.

In order to obtain a scene using this detector, the scene is projected through suitable optics onto the array of elementary detectors, each of them constituting an image dot or pixel, and clocked electrical stimuli are applied via the read circuit to each of the elementary detectors or to each row of such detectors in order to obtain an electrical signal which is an image of the temperature reached by each of said elementary detectors. This signal is then processed to a greater or lesser extent by the read circuit and then, if applicable, by an electronic device outside the package in order to generate a thermal image of the observed scene.

The essential difficulty encountered when using bolometric detectors is the extremely small relative variation in their electrical resistance which is representative of the local temperature variations in an observed scene relative to the average value of these resistances.

The constructionally dictated presence of a finite thermal resistance between the bolometer and the substrate means that the temperature of the bolometer is influenced by the temperature of the substrate much more sensitively than temperature variations due to the incident flux which are the only variations to be taken into account from the point of view of the signal to be detected. Residual fluctuations in the temperature of the substrate under normal thermal stabilization conditions, all the more so if the detector does not have such a thermal stabilization system as is increasingly the case with this type of detector in order to reduce its cost, consequently produce an unwanted component in the signal obtained from the bolometer which adversely affects the quality of the signal. Conventionally, the substrate isothermally controlled in order to prevent or at least limit this effect.

In addition, "compensation" structures are used in order to minimize the effects of the temperature of the focal plane on the detector's response. These structures, which are usually bolometers referred to as "blind bolometers", i.e. bolometers which are not sensitive to the incident optical flux but which are sensitive to the temperature of the substrate, are used in order to generate a so-called compensation current which is subtracted from the current obtained from the imaging bolometers, i.e. the detection bolometers, due to the way in which the electronic circuit is configured.

These compensation structures are typically built so that they have a very low thermal resistance, particularly negligible thermal resistance, relative to the substrate, unlike the imaging bolometers.

This way, most of the current referred to as "common-mode current", i.e. current which is not representative of information originating from the scene to be detected, is eliminated.

Also and advantageously, because the compensation structures are substantially at the same temperature as the read circuit and therefore the focal plane, this actually allows significant rejection of any fluctuations in the temperature of the focal plane. Arranging these compensation structures "identically" and repetitively in each column of the array so as to reduce the complexity and overall dimensions of the circuit is a known tactic.

Every bolometer column is sequentially compensated by the same compensation structure when the image is electronically scanned one row at a time. However, compensation structures naturally exhibit spatial variations in resistance because of the technology processes used in their fabrication (which normally originate from the semiconductor industry).

In addition, blind bolometers, like imaging bolometers, as well as certain functions of the read circuit, are affected by noise phenomena in general and so-called "1/f" noise in particular. 1/f noise typically produces low-frequency drift, especially very low frequency drift, of the output level of the sensors which adversely affects the quality of the imager. The columnar arrangement of the compensation structures has a negative impact on the quality of the image because of low-frequency variations in the compensated signal which are asynchronous from one column to the next. Besides any special design and implementation measures taken in order to reduce this variability, compensation algorithms must, generally speaking, be developed and applied at the output of the imager in order to improve image quality.

Thus, in order to form an image sample (frame), all the bolometers in the first row are addressed (biased) simultaneously and their current is compensated by using the blind compensation structure located at the end of the column. The "row" signal obtained is processed and transferred to the output while the second row is addressed and this process is repeated until the last row is reached in order to complete the frame and then restarts identically for the next frame (see diagram in FIG. 2). It is apparent that low-frequency variations in the compensation current which initially affects all the elements in each column identically but differently from one column to the next, thereby produce slight, slowly-changing columnar contrast which has an adverse effect on the image quality. Besides the design and technology efforts made in order to reduce fixed variability and low-frequency noise, compensation algorithms must be developed and used in order to reduce these effects to a minimum level.

Recent imaging components use algorithmic processes to correct residual drifts in the output signal which are associated with fluctuations in the temperature of the focal plane. This approach aims to do away with thermal control devices ("thermoelectric" modules based on the Peltier-effect) which are expensive in terms of the actual component itself and its associated means of use. These simplified components are commonly referred to as "TECless" (TEC stands for ThermoElectric Cooler). The efficiency of these processes depends significantly on correctly and accurately assessing the variability of these compensation structures over the temperature variation range of the focal plane which one intends to allow for the envisaged application.

Read circuits for resistive bolometric detectors which use blind bolometers are described, for instance, in the following applications:

"Uncooled amorphous silicon technology enhancement for 25 μm pixel pitch achievement", E. MOTTIN et al, Infrared Technology and Applications XXVIII, SPIE Vol. 4820;

"320×240 uncooled microbolometer 2D array for radiometric and process control applications" B. FIEQUE et al; Optical Systems Design Conference, SPIE 5251, September 29;

"Low cost amorphous silicon based 160×120 uncooled microbolometer 2D array for high volume applications" C. TROUILLEAU et al; Optical Systems Design Conference SPIE 5251-16.

The electronic structures described in relation to the prior state of the art are designed primarily in order to read bolometers in the active array but can also be used to read blind bolometers if the read timing diagrams are adapted. But these cases are illustrated very schematically in FIG. 2.

The principle of reading an active array of bolometers is explained below in relation to FIG. 1.

Pixel 1 (the term "pixel" is construed here, by extension, as denoting all the structures located so that they are under the influence of one elementary detection point) comprises an active bolometer 2, an NMOS charge injection transistor 3 and a switch 4 which connects pixel 1 to read column 5 and is represented here by a dashed line. Compensation structure 6, which is also referred to as a base clipper in the terminology used in the technical field in question, comprises a blind bolometer 7 connected to power supply VSK and PMOS charge injection transistor 8. During normal operation, the PMOS transistor is in saturation mode. Its current $I_{comp}$ is defined by the expression:

$$Icomp = \frac{Vcomp}{Rcomp}$$

where:

Vcomp denotes the voltage across the terminals of compensation bolometer 7;

Rcomp denotes the resistance of said compensation bolometer.

Being the active arm, the current flowing through NMOS charge injection transistor 3 is expressed by the relation:

$$Iac = \frac{Vac}{Rac}$$

where:

Iac denotes the current of the active arm;

Vac denotes the voltage across the terminals of active bolometer 2;

Rac denotes the resistance of said active bolometer.

The bias voltages of the MOS charge injection transistors are chosen so that, in the absence of any incident scene light flux, i.e. for example when the system is optically shuttered, the difference in current $dI = I_{comp} - I_{ac}$ between the active arm and the blind arm is substantially zero.

Reading an active bolometer is a two-phase operation. The first phase involves actuating "reset" switch 9 which short-circuits integration capacitance 10 of operational amplifier 11. This gives:

$$V_{out} = V_{BUS}$$

Read column 5 shown by dashed line 5 is therefore brought to the potential $V_{BUS}$. "Reset" switch 9 is then opened and "select" switch 4 is closed to connect pixel 1 to read column 5. Current difference dI is integrated by capacitance Cint 10 over finite integration time $T_{int}$. Integration produces an output voltage level referred to as "continuous level" or NC in the reference case where a uniform temperature scene is observed, this typically reveals the variability of the imaging array. This is the standard method for characterizing the reading of active bolometers.

$$NC = VBus - \frac{Tint}{Cint} dI$$

Bolometers are biased so as to ensure both a dynamic output signal response and efficient compensation.

A more rigorous expression would be obtained by considering, for the last term, the integral of the function dI(t) over Tint because currents $I_{ac}$ and $I_{comp}$ are not constant. However, for the sake of clarity, the above expression is sufficient to explain the parameters which are to be taken into consideration.

This read system has certain limitations associated with the way in which the columnar compensation pattern is reproduced on the read circuit. In fact, each column has a compensation bolometer and a PMOS charge injection transistor. Imperfect reproduction of these various elements from one column to the next which is inherent in the intrinsic spatial variability of the fabrication technologies used results in non-uniform compensation efficiency. This statistical variability results in a compensation current which is not uniform from one column to the next and causes the appearance of visible columnar contrasts which thus affect the available signal.

The conventional read circuit for active bolometers can be used in order to read blind compensation bolometers. To achieve this, at the end of a frame (i.e. after reading the last row), the first capacitance reset phase is performed. Once again:

$$V_{out} = V_{bus}$$

"Reset" switch 9 is then released but "select" switch 4 is left open in order to measure the value of the resistance of blind bolometer 7 on its own. All the current which flows in the compensation arm is therefore integrated over time Tint by capacitance Cint 10. In this situation, the output voltage Vout of the system is expressed as follows:

$$Vout = Vbus - \frac{Tint}{Cint} \times Icomp = Vbus - \frac{Tint}{Cint} \cdot \frac{Vcomp}{Rcomp}$$

The conventional read circuit therefore makes it possible to access the resistance value of blind bolometers through the output voltage of the system.

$$R_{comp} = \frac{Cint}{Tint \times Vcomp} \times (Vbus - Vout)$$

This type of circuit associated with this particular implementation has the advantage of providing direct access, for each frame, to the resistance value of the blind compensation bolometer and therefore, in principle, provides the necessary data for the correction algorithm (elimination of columnar image interference). Nevertheless, it does have certain limitations.

Firstly, the system integrates all the bias current of the bolometer. This current is typically 20 to 50 times greater than the current which is normally integrated when reading an active bolometer in the standard compensated mode. Consequently, the integration time must be reduced in comparison with reading a row of active bolometers in order to prevent integration capacitance Cint becoming saturated well before the end of the integration time. This complicates the implementation of reading from the point of view of managing the timing of stimuli.

In addition, this cycle thermally disturbs compensation bolometers (which typically have a very low thermal resistance which is, however, not zero) and therefore their resistance. When the active rows are read, the compensation bolometers are biased periodically (depending on the row frequency) for a constant time span. The Joule effect, linked with the flow of compensation current through these bolometers, brings them to an identical temperature at the start of every integration cycle (for each row) or, more precisely, subjects them to a precisely repetitive thermal profile during every integration cycle until the last row is read. When the row of blind compensation bolometers is then read, this cycle is disturbed because one must apply an integration time Tint which is much shorter (by a factor of 20 to 50 as explained above). This results in temporary thermal disturbance which causes a continuous-level shift and hence, given any scene, image disturbance at the start of the next frame.

Interference with the same origin also occurs if the frame is scanned for a duration which is less than the image refresh time. There is a latency time, which may be considerable, between successive frame reads, i.e. between the end of one frame read and the start of the next frame read.

This problem can, for example, be resolved by making the read circuit more complex in order to keep the temperature of the compensation bolometers substantially constant or at the least maintain the periodicity of the temperature timing profile over all the rows of the frame. To achieve this, a "preheat" or "substitution" current similar to the average current which flows through the blind bolometers during the integration time can be injected by using a special device in order to maintain the temperature of the blind bolometers during intervals when there are no integration periods. This device typically comprises an additional source of fixed current supplemented by a repetitive switching system with the active arm driven so as to eliminate breaks between periods. This substitution-current switching is activated between two row reads as well as in the time interval between reading the last row (blind in this case) and restarting the first row of the next frame. The temperature and therefore also the resistance of the compensation bolometers are therefore substantially constant over time: there is no longer any transient thermal disturbance.

There is then a problem if the temperature of the component varies and there is no temperature stabilization device (which is often the case). Classically, the nominal operating temperature range of detectors is −40° C. to +120° C. The preheat current source is then sized to give a median operating point, for example 30° C. At this temperature, the substitution current is adjusted so that it is representative of the average current of the active arm. This adjustment becomes inadequate if the temperature of the focal plane differs greatly from this point and one is again confronted with at least some of the thermal variation defects which affect blind bolometers in the read time interval between one frame and the next frame. This problem is also solved by the invention described below.

Another more problematic limitation associated with this circuit/implementation combination is relevant with regard to software (algorithmic) correction of image columning. In fact, the relevant point in terms of algorithmic correction is not the absolute value of the resistance of the blind bolometer but rather its variability, i.e. its distribution from one column to another. If there is precisely zero variation, there is no columning, regardless of the common value of the compensation resistances. From this point of view, the system for reading blind bolometers according to the prior art explained above is not suitable for precisely evaluating differences between resistances. One is interested in the sensitivity of the output voltage as a function of the variation in the resistance of the blind bolometer which is given by the following relation:

$$\frac{\delta Vout}{\delta Rcomp} = \frac{Tint}{Cint} \times \frac{Vcomp}{Rcomp^2}$$

Given the resistance values of blind bolometers and the limitation placed on the integration time discussed above, the value of the sensitivity thus defined is relatively small. By way of a numerical example:
Cint=6 pF
Tint=3 µs
Vcomp=3V
Rcomp=1.6 MΩ
Output voltage swing=3 V $$\frac{\delta Vout}{\delta Rcomp} = 586\,e - 9\,\text{V}/\Omega$$

The gain (this term is equivalent to "sensitivity") of the structure is relatively small and the wanted signal is all the more difficult to analyze (less accurate). A resistance variation of 3 kΩ actually represents a 2 mV wanted signal. For those skilled in the art, assuming a 12-bit analogue-to-digital converter (ADC) which covers the entire dynamic response (typically 3 V) of the detector, the wanted signal represents 2.7 least significant bits (LSB), i.e. less than 2 bits which can actually be used and this is typically totally inadequate to feed effective algorithmic correction.

The invention proposes a method for precisely evaluating the variation (distribution) in the resistance of these compensation bolometers and any drift thereof in time. The main attraction is to provide algorithm developers with data which is more accurate than that provided by techniques according to the prior art and, consequently, to offer improved corrected image quality.

SUMMARY OF THE INVENTION

This device for detecting electromagnetic radiation, especially infrared radiation, comprises an array of elementary bolometers which are sensitive to the incident radiation and are referred to as "active" bolometers and an additional row of bolometers (12) which are substantially insensitive to said radiation and are referred to as "blind", said active and blind bolometers being formed on a substrate in which a read circuit is produced for sequential addressing of each of the rows of the array and the row of blind bolometers, each of the bolometers in the same row being biased simultaneously.

According to the invention:

the read circuit also comprises a source for producing a reference current ($I_{ref}$) on the basis of an additional blind bolometer which is also formed on the substrate and means of copying said reference current ($I_{ref}$) to each of the columns of the array consisting of a current mirror;

each of the columns of the array comprises a compensation structure designed to shunt most of the background electric current or common mode current comprising a blind bolometer of said additional row, associated with a current integrator designed to integrate the difference between the current flowing through the active bolometer of the row which is currently being read and a compensation current output by the blind bolometer;

during the phase when the signal is formed or said additional row is read, a copy of reference current ($I_{ref}$) is obtained from the current output by the blind bolometer via a switch.

In other words, the invention involves using compensation structures to provide compensation when the above-mentioned switch is closed, i.e. during the phase when the compensation bolometers are read, in order to make it possible to accurately determine the variation in the resistance of the blind bolometers which constitute said compensation structure, as well as any drift which may affect them over time, thus making it possible to establish an appropriate compensation processing algorithm.

According to the invention, the compensation structure comprises:

a so-called compensation bolometer having a resistance $R_{comp}$;

a power supply line (VSK) connected to one of the terminals of said resistance $R_{comp}$;

a charge injection transistor connected, firstly, to the other terminal of said resistance so as to impose a compensation current ($I_{comp}$) through said resistance $R_{comp}$ by means of a voltage (GSK) on its gate and connected, secondly, to the negative terminal of the integrator.

According to the invention, the source for producing the reference current ($I_{ref}$) comprises:

the additional blind bolometer having a resistance $R_{comp\text{-}réf}$;

a charge injection transistor connected to one of the terminals of said resistance $R_{comp\text{-}réf}$ and which ensures biasing of said resistance;

a power supply line connected to the other terminal of said resistance $R_{comp\text{-}réf}$;

a current mirror connected to the other terminal of the transistor.

According to the invention, each of the blind bolometers comprises one or more elementary blind bolometers connected to each other and collectively having a negligible thermal resistance relative to the substrate.

The current mirror used comprises:

a first reference transistor located close to the source of reference current ($I_{ref}$), the source of which is connected to the system ground and the drain and gate of which are connected to the source of the charge injection transistor of said reference current source;

a column copying transistor, the gate of which is common (isopotential) with the gate of said first reference transistor, the source of which is grounded and the drain of which is connected to the switch which connects the system for reading the blind bolometers to the negative input of the integrator.

The transistors which constitute the current mirror can be NMOS or PMOS type transistors.

Using such a current mirror produces, as is known, parasitic noise which one may wish to reduce as much as possible. To achieve this, one advantageous version of the invention proposes associating a component suitable for producing an ohmic voltage drop, especially a long resistor or transistor, with the two transistors which constitute said mirror.

The term "long transistor" is well known to those skilled in the art and denotes a transistor, the length of which, i.e. the distance between its drain and its source, is much greater than its width.

In addition, the copying accuracy of the current mirror may be compromised by the effect of the variation which is inherent in the transistors of the current mirror. In order to reduce this effect, another advantageous version of the invention proposes using a cascode mirror which connects two transistors of the same type in a series, the source of the extreme transistors being grounded.

According to the invention, the switch which connects reference current $I_{ref}$ to the input of the integrator is kept closed when all the select switches of the active pixels are open. In other words, the device comprises a logic circuit capable of keeping said switch closed at all times when no row is selected for reading, i.e. when all the row addressing switches are open.

The invention also relates to an imaging system which uses an infrared detection device as described above. This system includes an algorithmic function to correct the output signals of every row of every frame as a function of the particular "row" signal obtained by closing the switch which connects said reference current $I_{ref}$ to the input of the integrator when reading the row of blind bolometers.

BRIEF DESCRIPTION OF THE DRAWINGS

The way in which the invention is implemented and its resulting advantages will be made more readily understandable by the following description, given merely by way of example, reference being made to the accompanying drawings.

DETAILED DESCRIPTION OF THE INVENTION

In the rest of this description, the same reference numbers are used to identify elements which are identical or of the same functional type, when applicable.

Generally speaking and as already stated, the array of bolometric detectors is formed on a silicon substrate in which the read circuit is produced. This substrate is traditionally covered, in the area of its active structures, i.e. vertically below those areas that constitute the bolometric material, in a reflective metallic layer. This layer is designed, in a known manner, to reflect any radiation which is not absorbed.

The optically active areas are formed by "paved" suspended membranes which comprise, above the read circuit, a bolometric material. These membranes are supported by means of structures which are substantially vertical and electrically conductive. These structures, made of a metallic material, are also designed to route the excitation potentials generated by the read circuit towards the conductive parts, also referred to as "electrodes", of the membrane of each elementary bolometric detector via elongated structures which are also electrically conductive but thermally non-conductive.

This thermal resistance which is also referred to as "thermal isolation" is intended to allow the temperature of the bolometer to rise due to the effect of the infrared radiation that is to be detected.

The read circuit sequentially applies an electrical current which flows through the suspended structure. This current flows through a material, the resistivity of which varies with temperature and which is referred to as a "bolometric material". The most widely used materials for this application are vanadium oxide (generic formula $VO_x$) and amorphous silicon (a-Si).

Figure 1:
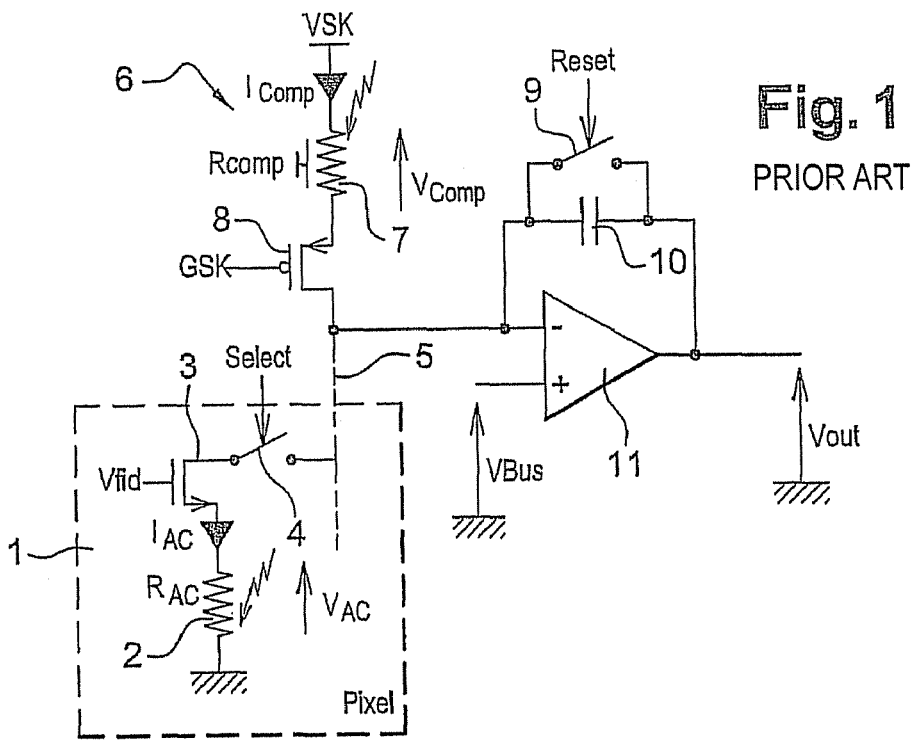
FIG. 1, described above, is a schematic view of the principle used to read an array of active bolometers.
Figure 2:
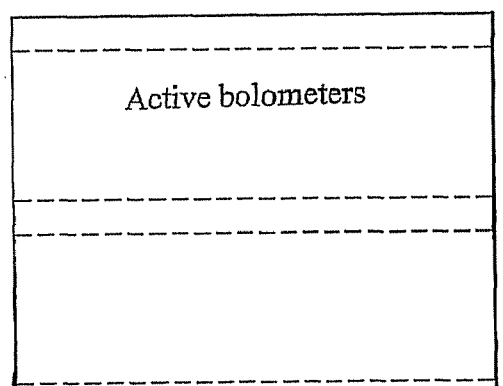
FIG. 2 shows the read cycle for an array of bolometers equipped with a row of blind bolometers in accordance with the prior art.
Figure 2:
Figure 3A:
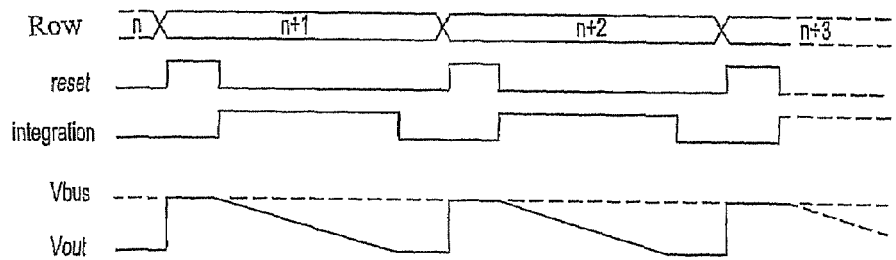
FIG. 3a shows a timing diagram for reading the active rows of a bolometer array and FIG. 3b is a timing diagram for reading a blind-bolometer row, once again in accordance with the prior art.
Figure 3B:
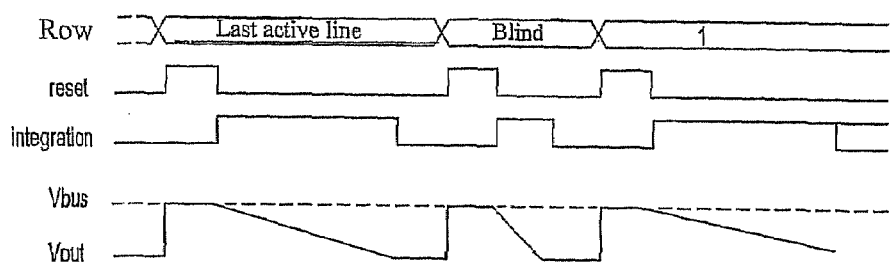
Figure 4:
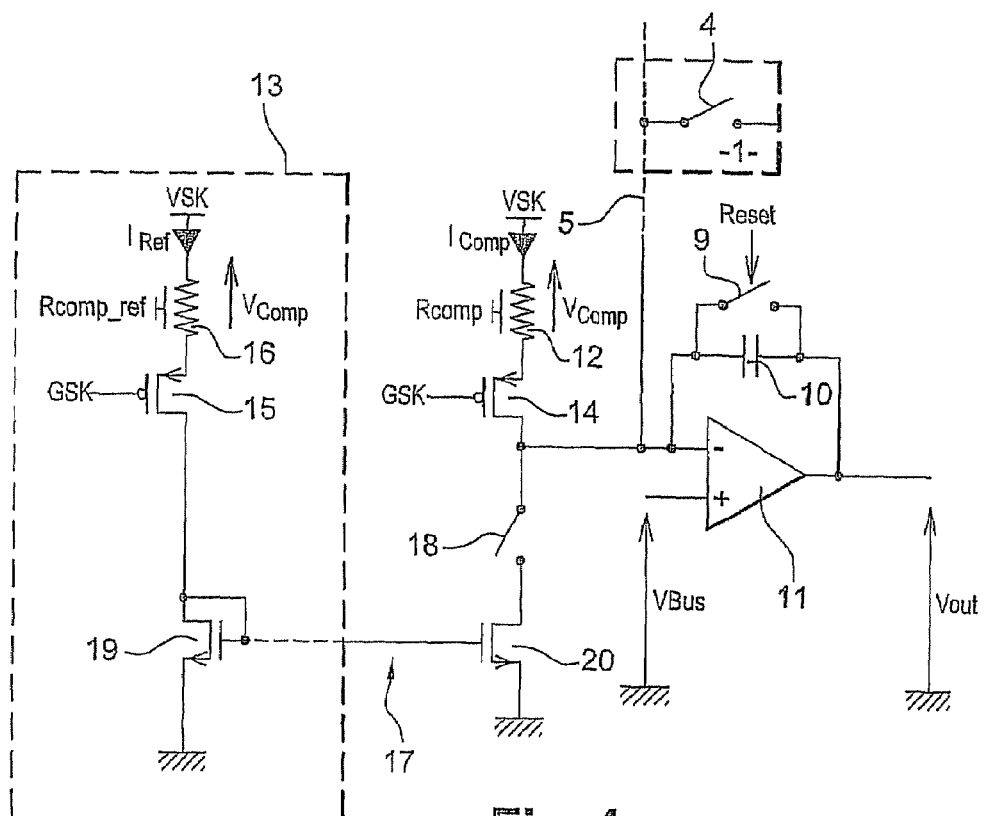
FIG. 4 is a schematic view similar to FIG. 1 but showing the general principle of the invention using NMOS type transistors in the current mirror.

This array is provided with a compensation structure designed to shunt most of the common mode current which flows through each of the bolometric detectors which constitute the array, the principle of which is described in relation to FIG. 4. In fact, each of the columns of the array comprises such a compensation structure which therefore constitutes a so-called "blind" row because it consists of blind bolometers, said row being read by the read circuit in the same way as the active rows.

According to one aspect of the invention, this compensation structure associated with each of the columns comprises a blind compensation bolometer 12 with a resistance $R_{comp}$ consisting of one or several elementary bolometers connected together. One of the terminals of said resistance $R_{comp}$ is grounded. The other terminal of said resistor is connected to the drain of a charge injection transistor 14 so as to impose a voltage $V_{comp}$ across the terminals of resistance $R_{comp}$ of compensation bolometer 12 by means of a gate voltage (GSK) applied to the gate of said transistor, thus ensuring biasing of said resistance. The source of charge injection transistor 14 is connected to an integration structure comprising:

operational amplifier 11 mounted as an integrator;
integration capacitance 10 Cint, connected between the output of the amplifier and the negative input of the amplifier, in which one integrates the incoming useful current at the negative input of said amplifier;
a reset switch 9 connected between the output of the amplifier and the negative input of the amplifier which ensures resetting of the charges stored in integration capacitance 10;
a reference voltage Vbus connected to the positive input of amplifier 11 to set the operating point of the structure.

According to the invention, the compensation structure described is associated with a single reference current for the entire array located outside said array. This reference current 13 is represented in FIGS. 4 to 7 by a dashed line.

It comprises a blind bolometer $R_{comp-réf}$ 16 which is constantly biased by means of charge injection transistor 15 which is controlled by gate voltage GSK. This gate voltage equals that of charge injection transistors 14 which are in the compensation structures of each of the columns. Reference current $I_{réf}$ is then copied to all of the columns by using current mirror 17 which can be switched thanks to switch 18.

Current mirrors are very familiar to those skilled in the art and therefore, there is no need to describe them here in more detail. The reader is simply reminded that such a current mirror is a special circuit consisting of two transistors 19, 20 which make it possible to reflect reference current $I_{réf}$ as an output current which is ideally equal to but always proportional to the reference current regardless of the load connected to the output current, in this case the integrator described above.

In the example described, current mirror 17 is produced by using two NMOS transistors 19, 20. Obviously, care is taken to size said transistors so as to minimize the variation in the threshold voltage of the transistors which might interfere with measuring the variation of blind resistances 12 by introducing copying errors.

Here, the source of a first reference transistor 19 is connected to the system ground. Its drain and gate are connected to the source of charge injection transistor 15 of the reference current source.

Consequently, the current mirror comprises a column-copying transistor 20. The gate of this transistor is common with the gate of said first reference transistor 19 and its source is also grounded. Its drain is connected to switch Lec 18 which connects the read system of blind bolometers 12 to the negative input of above-mentioned amplifier 11.

Figure 5:
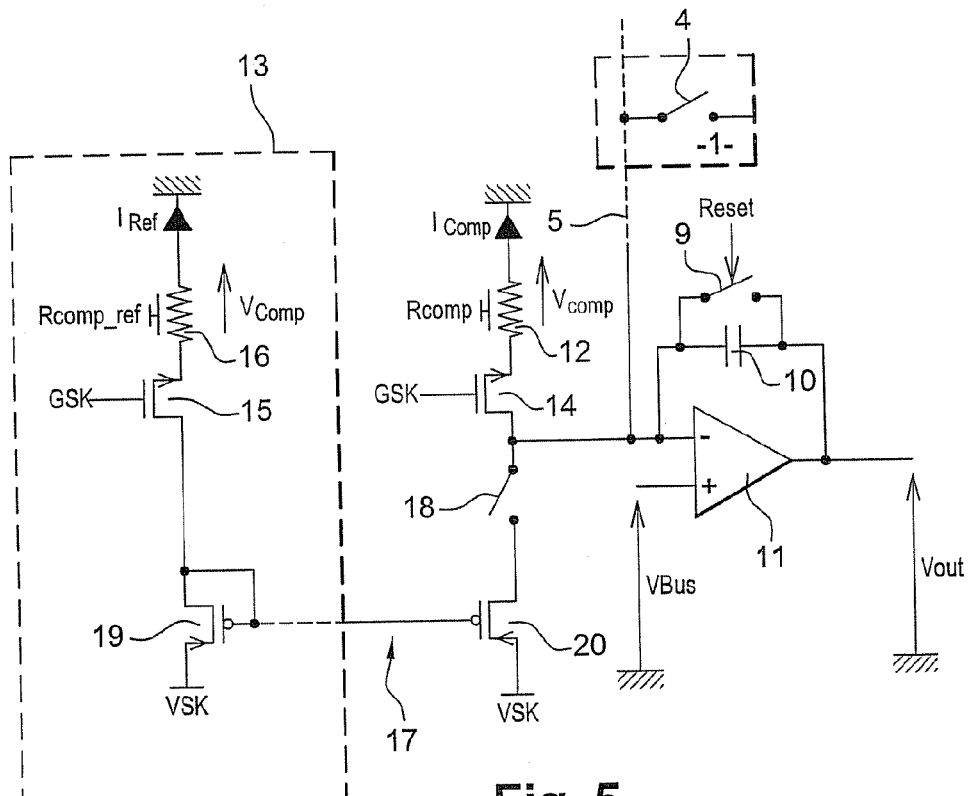
FIG. 5 is a view similar to FIG. 4 in which the NMOS type transistors of the current mirror have been replaced by PMOS type transistors.

In the example in FIG. 4, transistors 19, 20 of the current mirror are NMOS type transistors. FIG. 5 shows another embodiment of the invention in which the mirror is produced using PMOS transistors.

When blind bolometers $R_{comp}$ 12 of the compensation structure need to be read, Reset switch 9 is initially closed (as when reading every active row) in order to reset the charges stored in integration capacitance Cint 10. After this, Reset switch 9 is opened and switch 18, which connects current mirror 17 to the compensation structure across all the columns simultaneously, is closed.

If there is no variation in the resistances of compensation bolometers 12, the current flowing through each compensation structure is identical. Reference current $I_{réf}$ therefore equals the current which flows in the compensation structure of each column. The integration current in capacitance 10 is then zero; for every column, the following therefore applies:

Vout=Vbus

On the other hand, if the resistance of blind bolometers 12 varies from one column to the other, which is generally the case technically speaking, current $I_{comp}$ of the compensation structure will differ slightly from that of current mirror 17. For each column, a differential current is therefore integrated:

$$dI_{comp} = I_{comp} - I_{ref}$$

it being understood that current $I_{comp}$ differs slightly from one column to the next.

Continuous output level NC for the "signal" line corresponding to the blind compensation bolometers, hereinafter denoted as $NC_{comp}$, therefore satisfies the relation described above with regard to the prior state of the art when the active bolometers are read, namely:

$$NC_{comp} = Vbus - \frac{Tint}{Cint} dI_{comp}$$

The distribution of output levels $NC_{comp}$ is therefore directly representative of the distribution of the resistances of compensation bolometers 12 (centered around the quiescent point Vbus) rather than the absolute resistance of the bolometers because the common-mode component has been subtracted exactly.

The series of signals $NC_{comp}$ can then be used, with great accuracy, in order to obtain algorithmic correction of every frame obtained.

The structure according to the invention makes it possible to read the variability of the blind compensation bolometers more accurately. The following still applies:

$$\frac{\delta Vout}{\delta Rcomp} = \frac{Tint}{Cint} \times \frac{Vbolo}{Rcomp^2}$$

But in the case of the invention, there is no need whatsoever to reduce the integration time because the current that is to be integrated is of the same order of magnitude as when reading an active bolometer. The numerical application which follows is to be taken as an example:

Cint=6 pF
Tint=60 µs
Vbolo=3 V
Rbolo=1.6 MΩ
Output voltage swing=3 V $$\frac{\delta Vout}{\delta Rcomp} = 11.718e - 6 \text{ V}/\Omega$$

In this case, there is a twentyfold gain in accuracy (the ratio of the integration times used) compared with the prior state of the art. This improved accuracy represents 4,3 additional correction bits which are, in total, equivalent to 7 correction bits, a level which is entirely satisfactory in terms of possible algorithmic quality correction.

Such algorithmic correction typically involves applying the following process: assuming the imaging retina has N columns and M rows:

acquisition of N levels Vout[1–N] of the M activated rows of a frame (i.e. acquisition of a raw image);

acquisition of N levels $NC_{comp}$[1–N] according to the method described above, equivalent to reading the compensation row;

correction of N output levels of every row, applied successively to M rows by a calculation of the following type:

$$V_{coil}[1-N] = V_{out}[1-N] - NC_{comp}[1-N] + \overline{NC_{comp}}$$

where $\overline{NC_{comp}}$ represents the average value of N values $NC_{comp}[1-N]$ Obviously, this calculation is applied digitally once the $V_{out}$ and $NC_{comp}$ data streams have been subjected to analogue-to-digital conversion.

Consequently, the structure described makes it possible to simplify the control electronics of bolometric sensors. In fact, as far as the user is concerned, nothing distinguishes a blind line from an active line. There is no longer any need to modify the integration time specifically for reading the line of blind bolometers and the control signals are identical.

In addition, the thermal cycle is no longer disturbed by addressing the row of blind bolometers because the latter dissipate the same quantity of energy due to the Joule effect regardless whether they are connected in "compensation" mode or in "read" mode. There is no longer any disturbance when reading rows subsequent to reading the blind bolometers.

Finally, the invention makes it possible to overcome the problem of "thermal management" of blind bolometers in a radical, elegant manner. In fact, when blind bolometers 12 are not used, i.e. when they are not connected to the integrator, it is sufficient to connect read current-mirror 17 instead of the fixed-current source used in circuits according to the prior state of the art. According to the invention, the reference current source is produced using a blind reference bolometer 16 $R_{comp-réf}$. This being so, the reference current automatically tracks, by structural design, the temperature of the read circuit so that it constitutes an ideal "substitution" current for keeping the temperature of the compensation bolometers constant, row after row, regardless of the frame and temperature timing diagram of the substrate.

In terms of circuitry, switch 18 is closed and kept closed at all times, except when any one of the row select switches 4 is closed. This way, copied current $I_{ref}$ constantly flows through each compensation bolometer.

In a known manner, the current mirror introduces additional noise when the blind bolometers are read. In fact, because it uses multiple MOS structures, the circuit produced according to FIG. 4 may have limitations due to the geometrical and technological variability of the multiple MOS structures used.

Figure 6:
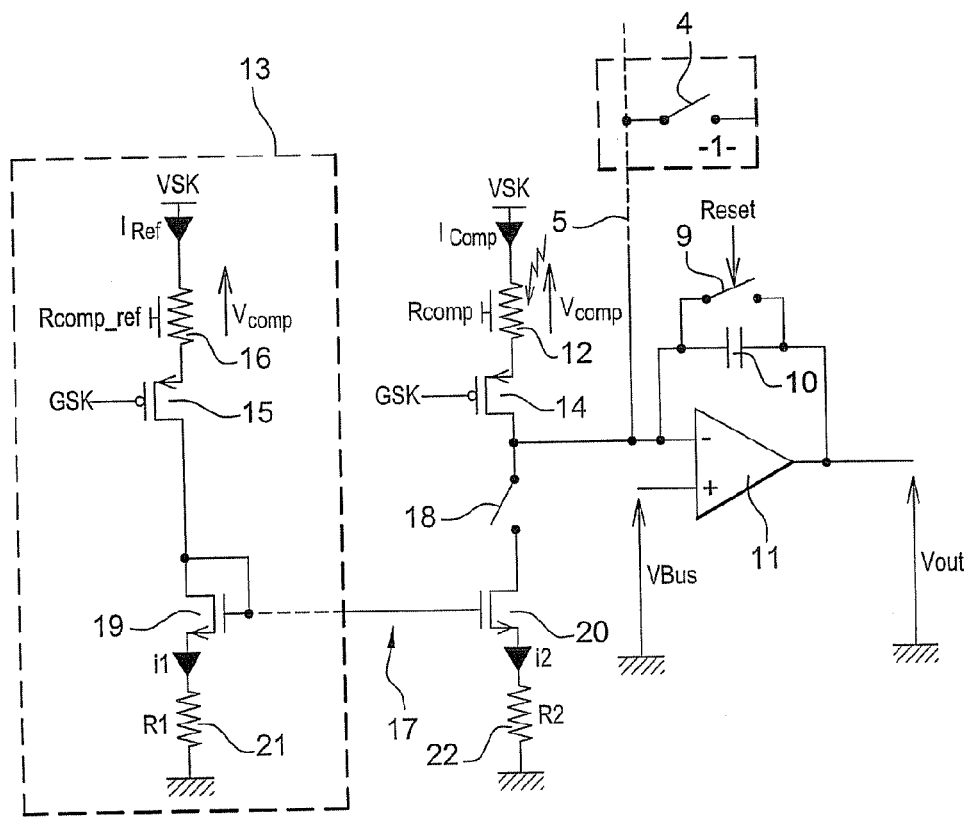
FIG. 6 is a schematic view of a more advanced version of the invention for a so-called "low noise" application capable of reducing the noise generated by the current mirror.

In order to reduce the current mirror's inherent temporal noise, one can use a more advanced arrangement of the embodiment of the invention in FIG. 4, as shown in FIG. 6. In this case, the proposed arrangement aims to make the current mirror "degenerate" (specialist term) by using two resistances R1 and R2, denoted by 21 and 22 in FIG. 6, connected to the respective drain of each of transistors 19 and 20. Resistances 21, 22 are used to make current mirror 17 degenerate, in a manner familiar to those skilled in the art. The current copying accuracy is improved by the ohmic voltage drop across the terminals of resistances 21, 22.

Because of this, the noise introduced by the mirror formed by NMOS transistors 19, 20 is reduced and the copying accuracy is better.

Resistances 21, 22 can be replaced by long NMOS transistors in order to achieve the same objective.

Figure 7:
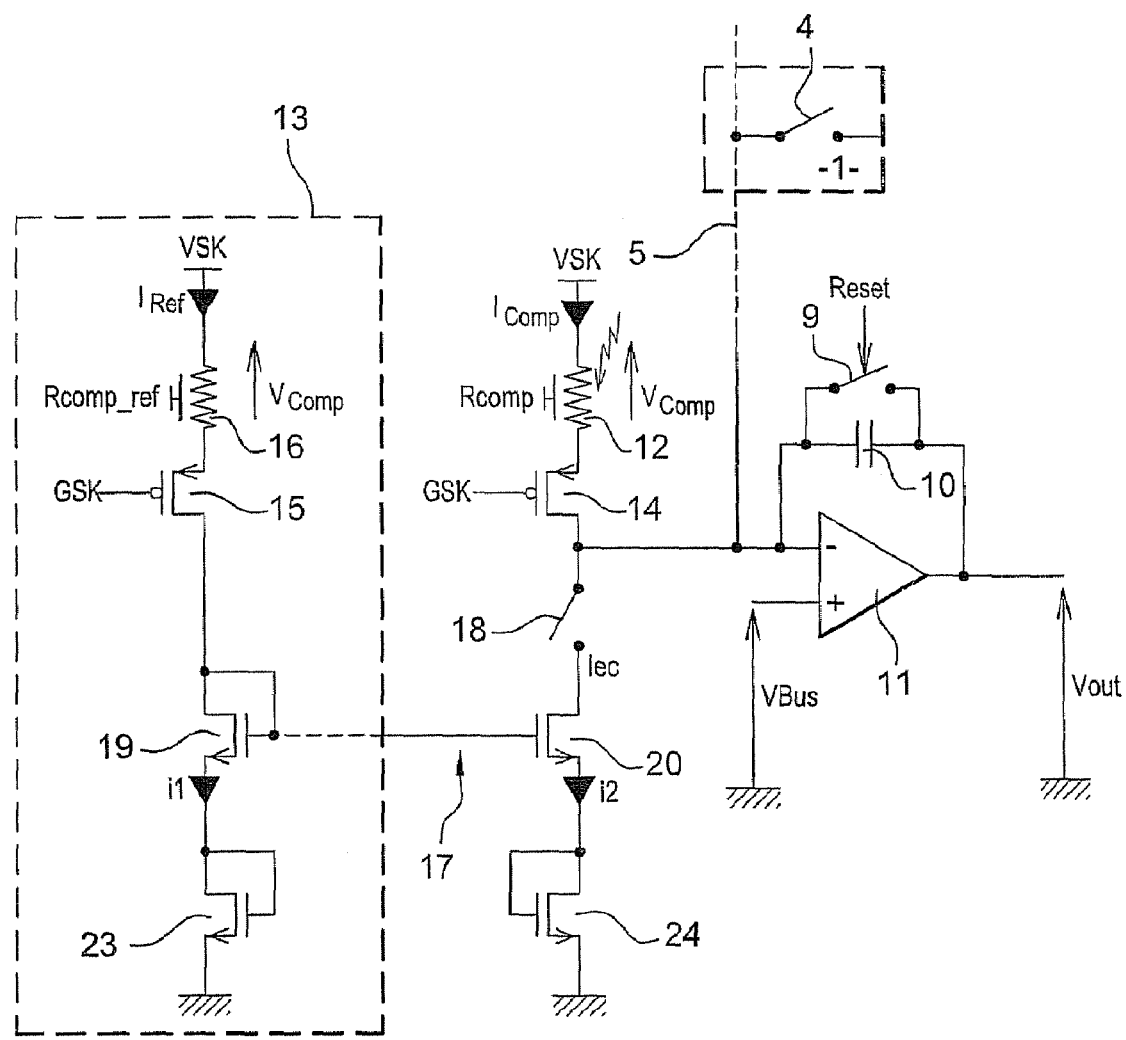
FIG. 7 is a schematic view of a version of the invention which is also more advanced for a so-called "low offset" application capable of reducing the variations inherent in the current mirror.

According to another advantageous embodiment of the invention shown within FIG. 7, attempts are made to diminish the effect of variability of the transistors used which is likely to affect the current mirror's spatial copying accuracy.

To achieve this, one uses a "cascode" mirror in which the drain of the two NMOS transistors 19, 20 in the basic configuration shown in FIG. 4 are connected respectively to the source of the two NMOS transistors 23, 24, the drain of which is grounded.

Obviously, the characteristics of the transistors which constitute the current mirror are chosen so as to make the circuit insensitive to geometric variations.

The cascode structure described makes it possible to limit the impact of variation in threshold voltages Vt on copying accuracy. This embodiment is especially advantageous because it also makes it possible to assess, and therefore digitally correct (by using an appropriate algorithm), the variability of PMOS charge injection transistor 14 of blind bolometer 12 via the result of reading the blind bolometers ($NC_{comp}$ values). In fact, using the system as shown within FIG. 7, the variation in Vt of NMOS transistor 20 of current mirror 17 are of the same order of magnitude as the variation of Vt of PMOS charge injection transistor 14, but its impact on the variation of current $I_{comp}$ is much less than the impact of variation of Vt of PMOS transistor 14.

Finally, for the same reason, this circuit males it possible to measure the low-frequency drift of the resistances of the bolometers and PMOS charge injection transistors 12 associated with 1/f noise. It therefore becomes possible to compensate, in software, not only the residual offset (fixed columning effect) but also very low-frequency noise originating from the occurrence of variable residual columning in the observed signal which is problematic in the case of applications which do not have mechanical shutters.

The invention has particular applications in the field of image sensors which use bolometric detection, regardless of the optical detection band and the type of bolometric sensor used (especially, but not imitatively, based on amorphous silicon (a-Si), vanadium oxides (Vox) and metals (Ti)).

Besides this, because of its ability to adapt to various operating temperatures, the invention is also applicable to thermally controlled sensors as well as to sensors which operate with a variable focal-plane temperature and are commonly referred to as "TECless".

Moreover, its intrinsic good low-frequency noise performance across columns, thanks to a highly accurate correction algorithm, makes it possible to integrate detectors produced in accordance with the invention in cameras which have no shutter.

Obviously, the invention is also perfectly compatible with traditional cameras which do have such a shutter. This achieves a substantial reduction in the manufacturing and integration costs of such cameras and also simplifies their use by the user.

The invention claimed is:

1. A device for detecting electromagnetic radiation, comprising an array of elementary bolometers which are sensitive to incident radiation and are referred to as "active" bolometers and an additional row of bolometers which are substantially insensitive to said radiation and are referred to as "blind", said active and blind bolometers being formed on a substrate in which a read circuit is produced for sequential addressing of each of the rows of the array and the row of blind bolometers, each of the bolometers in the same row being biased simultaneously, wherein the read circuit also comprises a single source for producing a reference current ($I_{ref}$) on the basis of an additional blind bolometer which is also formed on the substrate and means of copying said reference current ($I_{ref}$) to each of the columns of the array consisting of a current mirror;

wherein each of the columns of the array comprises a compensation structure designed to shunt most of the background electric current or common mode current comprising a blind bolometer of said additional row, associated with a current integrator designed to integrate the difference between the current flowing through the active bolometer of the row which is currently being read and a compensation current output by said blind bolometer of said additional row; and wherein during the phase when said additional row is read, a copy of reference current ($I_{ref}$) is derived from a current output by said additional blind bolometer via a switch connected to said current integrator.

2. A device for detecting electromagnetic radiation, as claimed in claim 1, wherein the compensation structure comprises:

said blind bolometer of said additional row having a resistance $R_{comp}$;

a power supply line (VSK) connected to one of the terminals of said resistance $R_{comp}$; and a current injection transistor connected, firstly, to the other terminal of said resistance so as to impose a compensation current ($I_{comp}$) through said resistance $R_{comp}$ by means of a voltage (GSK) on gate of said current injection transistor and connected, secondly, to the negative terminal of the integrator.

3. A device for detecting electromagnetic radiation, as claimed in claim 2, wherein said blind bolometers each consist of one or more elementary blind bolometers connected to each other and collectively having a negligible thermal resistance relative to the substrate.

4. A device for detecting electromagnetic radiation, as claimed in claim 3, wherein select switches are provided to select the active bolometers to be read, and wherein said switch which connects reference current $I_{ref}$ to the input of the integrator is kept closed when all the select switches are open.

5. A device for detecting electromagnetic radiation, as claimed in claim 1, wherein the source for producing reference current ($I_{ref}$) consists of:

said additional blind bolometer having a resistance $R_{comp-réf}$;

a current injection transistor having one terminal connected to one of the terminals of said resistance $R_{comp-réf}$ and which ensures biasing of said resistance;

a power supply line (VSK) connected to the other terminal of said resistance $R_{comp-ref}$; and said current mirror connected to the other terminal of the transistor.

6. A device for detecting electromagnetic radiation, as claimed in claim 1, wherein said current mirror comprises:

a first reference transistor, the source of said first reference transistor being connected to the system ground and the drain and gate of which are connected to the source of a current injection transistor of said reference current source; and a column copying transistor, the gate of said column copying transistor being common (isopotential) with the gate of said first reference transistor, the source of said column copying transistor is grounded and the drain of said column copying transistor is connected to said switch.

7. A device for detecting electromagnetic radiation, as claimed in claim 6, wherein the transistors which constitute said current mirror is of the NMOS type or of the PMOS type.

8. A device for detecting electromagnetic radiation, as claimed in claim 6, wherein one associates a component suitable for producing an ohmic voltage drop is combined with each of the two transistors which constitute said current mirror.

9. A device for detecting electromagnetic radiation, as claimed in claim 8, wherein the component which ensures an ohmic voltage drop consists of a resistance or a long transistor.

10. A device for detecting electromagnetic radiation, as claimed in claim 1, wherein said current mirror is of a cascade type, and comprises:

a first reference transistor, the drain and gate of said first reference transistor are connected to the source of current injection transistor of said reference current source;

a column copying transistor, the gate of said column copying transistor is common (isopotential) with the gate of said first reference transistor and the drain of said column copying transistor is connected to the said switch;

a first additional transistor, the drain of which is connected to the gate and to the source of the first reference transistor, and the source of which is connected to the ground; and a second additional transistor, the drain of which is connected to the gate and the source of the column copying transistor, and the source of which is connected to the ground.

11. An imaging system which uses a device for detecting an electromagnetic radiation as claimed in claim 1 and includes an algorithmic function to correct the output signals of every row of every frame as a function of the particular "row" signal obtained by closing said switch which connects said reference current $I_{ref}$ to the input of the integrator when reading the row of blind bolometers.

* * * * *